(12) United States Patent
Moore et al.

(10) Patent No.: US 6,631,791 B2
(45) Date of Patent: *Oct. 14, 2003

(54) BRAKE DISC WEAR INDICATOR

(75) Inventors: Roland S. Moore, Taylors, SC (US); Paul E. Jamieson, Greer, SC (US)

(73) Assignee: Westinghouse Air Brake Co, Wilmerding, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/461,923

(22) Filed: Dec. 15, 1999

(65) Prior Publication Data

US 2002/0060108 A1 May 23, 2002

(51) Int. Cl.[7] ............................................. F16D 66/00
(52) U.S. Cl. ........................ 188/1.11 W; 188/218 XL
(58) Field of Search ................ 188/1.11 R, 1.11 W, 188/18 A, 218 R, 218 XL; 116/208; 340/454

(56) References Cited

U.S. PATENT DOCUMENTS

| 3,414,272 A | * | 12/1968 | Rogers, Jr. .................. 277/2 |
| 5,878,479 A | * | 3/1999 | Dickerson et al. .......... 29/527.6 |
| 6,279,698 B1 | * | 8/2001 | Oberti .................. 188/218 XL |
| 6,308,803 B1 | * | 10/2001 | Oberti .................. 188/1.11 W |

FOREIGN PATENT DOCUMENTS

| DE | 4240494 | * | 6/1994 |
| GB | 2006900 | * | 5/1979 |

* cited by examiner

Primary Examiner—Jack Lavinder
Assistant Examiner—Bradley King
(74) Attorney, Agent, or Firm—James Ray & Associates

(57) ABSTRACT

A brake disc wear indicator comprising a brake disc rotor having two opposed braking surfaces for engaging opposed brake friction pads, and at least one hole provided in the rotor at a location behind a braking surface and at a predetermined depth and distance from the braking surface such that the hole is originally invisible by the presence of brake rotor material but becomes visible when brake rotor material is worn away to the extent that the hole becomes exposed and visible.

6 Claims, 2 Drawing Sheets

BRAKE DISC WEAR INDICATOR

FIELD OF INVENTION

The present invention relates, in general, to disc brakes and, more particularly, this invention relates to an indicator of brake disc wear using shallow holes provided in the casting of the brake disc.

BACKGROUND OF THE INVENTION

Prior to the development of the present invention, the normal industry practice for indicating wear on a brake disc, or rotor, utilized a chamfer located on the outer diameter of the braking surface. The dimensional thickness of the chamfer shows brake disc wear and, thus, shows the remaining brake disc material allowed for continued disc use. When the brake disc is worn sufficiently to substantially eliminate the chamfer, the brake disc is condemned and replaced.

There is a problem with this prior art type chamfer thickness approach in that these brake discs will typically exhibit wear in a concave manner (as can best be seen in FIG. 2 in the present application) so that such concave wear can allow the brake disc to be worn both to and beyond the minimum allowed before the chamfer disappears. This requires the user of the disc to measure the depth of the concave section and subtract such section from the remaining chamfer, which, of course, takes time and decreases the value of the chamfer to the user.

BRIEF SUMMARY OF THE INVENTION

The above-described problem is substantially solved, according to the present invention, by eliminating the chamfer altogether and casting wear indicating holes in the body of the brake disc. These wear indicating holes are located at the rear of braking surfaces such that these holes are obscured by the disc material subject to wear. When the material of the disc in front of the holes is worn to the extent that the holes appear at the front braking faces of the disc, the disc is considered worn to the extent that it is replaced. These wear indicating holes are cast into the body portion of the disc when the disc is manufactured, i.e., cast, and a plurality of the wear indicating holes can be circularly spaced and spread radially between the center hub and the periphery of the disc.

OBJECTS OF THE INVENTION

It is, therefore, a primary object of the present invention to provide wear indicating holes in the body of a brake disc at specific positions located at the rear of and thus behind the braking disc surface and associated disc material such that when the front braking faces of the disc are worn to the extent that the holes appear, the disc is replaced with a new unworn disc.

Another object of the present invention is to provide a brake disc in which the wear indicating holes are normally cast with bottom surfaces that are rounded to reduce the occurence of stress risers.

A further object of the present invention is to provide a brake disc in which the wear indicating holes can be provided with a conical, or varying diameter, shape to indicate a partially worn disc and thereby allow a predetermined amount of time at normal usage to schedule disc replacement.

Still another object of the present invention is to provide a brake disc in which a first appearance of the wear indicating hole from the front side of the brake disc may not require the immediate replacement of the disc but will provide the user/customer a period of time to schedule disc replacement.

In addition to the objects and advantages of the present invention described above, various other objects and advantages of the invention will become more readily apparent to those persons skilled in the relevant art from the following much more detailed description of the invention, particularly, when such description is taken in conjunction with the attached drawing Figures and with the appended claims.

DETAILED DESCRIPTION OF PRESENTLY PREFERRED EMBODIMENTS

Figure 1:
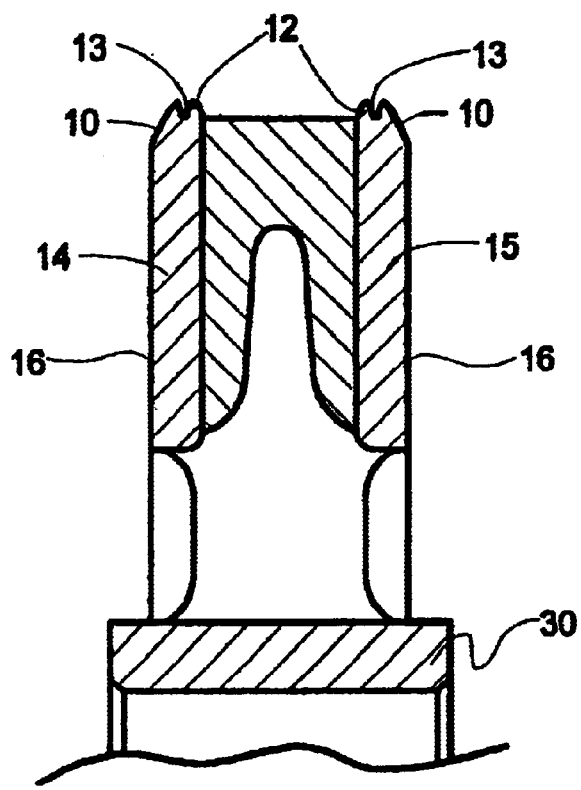
FIG. 1 is a partial cross-sectional view of a prior art type chamfered brake disc.

Prior to proceeding to the more detailed description of the present invention, it should be noted that identical components which have identical functions have been identified with the same reference numerals throughout the several views illustrated in the drawing figures for the sake of clarity and understanding of the invention.

Referring now to the drawings, FIG. 1 thereof shows the prior art scheme for measuring brake disc wear by chamfering the corners 10 of the outer peripheries 12 of opposed brake disc sections 14 and 15, or cutting a small groove 13 in the disc circumferences. As these disc sections 14 and 15 are used in the braking process and their braking surfaces 16 are worn away by brake friction pads (not shown) rubbing against such braking surfaces 16, the chamfers 10, or grooves 13, become smaller (narrower) until they disappear, which is the indicator for disc replacement.

Figure 2:
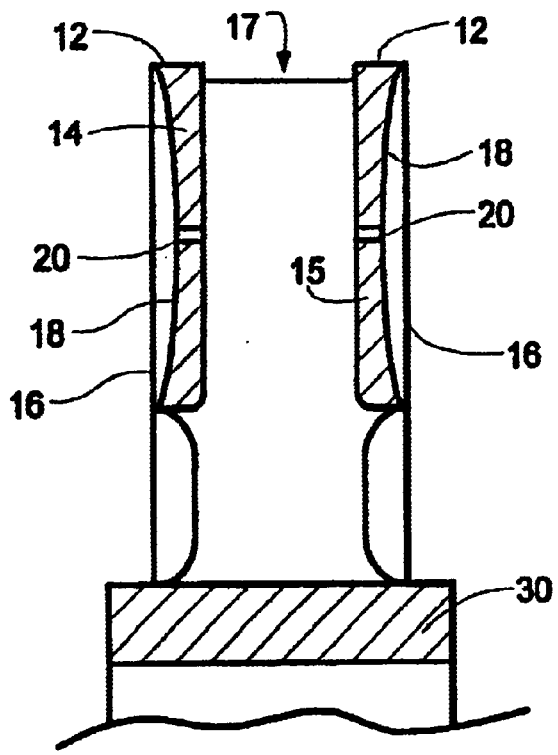
FIG. 2 is a partial cross-sectional view of a brake disc showing concave wear of the disc.

As explained earlier, however, the brake disc surfaces 16 (of a brake disc casting 17) will generally wear in a concave manner, as best seen in FIG. 2 of the drawings. This is denoted by the reference numeral 18. Such wear allows such brake disc casting 17 to be worn beyond the minimum wear allowed by chamfer 10, i.e., before the chamfer 10 disappears. The user must now measure the maximum depth of the concave sections 18 of the disc and subtract this measurement from any remaining chamfer 10 to determine the true disc wear. This requires time, which translates economically into dollar costs, and decreases the value of the chamfer 10 to the user of the brake disc casting 17.

Reference is now made, more particularly, to the sectional view of FIG. 2 which shows a simple, direct means to indicate the brake disc wear without the use of peripheral chamfers. This direct means in FIG. 2 is the provision of at least one hole 20 in each section 14 and 15 of the brake disc body 17 at a location behind braking surfaces 16.

There is brake disc material 22 located in front of such at least one hole 20. Such brake disc material 22 is shown in cross section in FIG. 3 of the drawings. Material 22 obscures holes 20 until material 22 is worn away by the braking process to reveal the holes. When the holes 20 are revealed, i.e., become visible, the brake disc is replaced by an unworn disc. Holes 20 are, therefore, located at a predetermined distance from the braking surfaces 16 of a new, unworn disc. This predetermined distance is, preferably, chosen on the basis of standard usage and experience so the user can rely on such usage and experience (and hole location) in calling for brake disc replacement.

Figure 3:
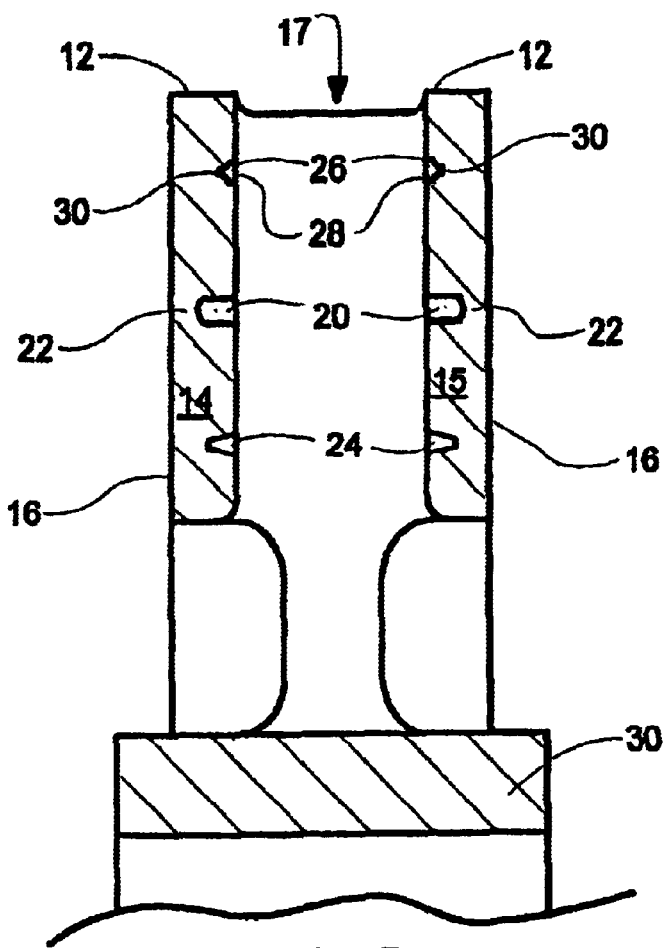
FIG. 3 is a partial cross-sectional view of the disc of the present invention having the presently preferred wear indicating holes of the invention.

In FIG. 2, the wear indicator holes 20 are shown located generally in the center of opposed concave disc sections 18. In FIG. 3 of the drawings, there are a plurality of wear indicating holes 20, 24 and 26 shown at different radial locations spaced between the peripheries 12 of the disc sections 14 and 15 and the integral hub 30 of the disc body.

As can be seen in FIG. 3, the center holes 20 are located at a predetermined depth behind the braking surfaces 16 in order to provide a first indication of wear but an indication not sufficient to require disc replacement. However, in the presently preferred embodiment of the invention, holes 24 and 26 provide a second and third indication of disc wear before disc replacement is required, if such holes 24 and 26 are located at different depths from each other in the brake casting and from center holes 20. If holes 24 and 26 are at the same depth, however, they provide only a second indication.

Another means to provide a varied indication of disc wear are the hole configurations of 24 and 26, as depicted in FIG. 3. It will be noted that the cross-sectional areas and diameters (if the holes are circular) of center holes 20 are substantially constant in FIGS. 2 and 3, while holes 24 in the disc of FIG. 3 have different diameters, i.e., the diameter of each hole 24 at the rear of disc sections 14 and 15 are relatively large but gradually decrease to a relatively small diameter in the direction of the braking faces 16 of the disc.

A similar hole configuration is shown at 26 in FIG. 3 wherein the wear indicating holes are provided with a relatively wide cross-section, or diameter, at 28 at the rear of each disc section 14 and 15, and a relatively narrow portion 30 extending in the direction of the braking surfaces 16.

In using holes 24 and/or 26 to indicate wear, the initial appearance of the holes, caused by the wearing away of overlying disc material 22, provides an indication that the brake disc sections 14 and 15 still have useful life. As the cross-sectional area, or diameter, of the holes 24 increase with further disc wear, the user is made aware of the further wear and can prepare to remove the disc when the diameter of such holes 24 reaches a maximum value.

In the case of holes 26, the initial small diameter 30 of the hole 26 appears first, with sufficient wear of disc material 22. This, again, gives the user an initial indication of wear but not enough to demand replacement of the brake disc 17. With further removal of brake disc material 22, the large diameter portion 28 of the hole 26 appears, which indicates that disc replacement is now necessary.

Figure 4:
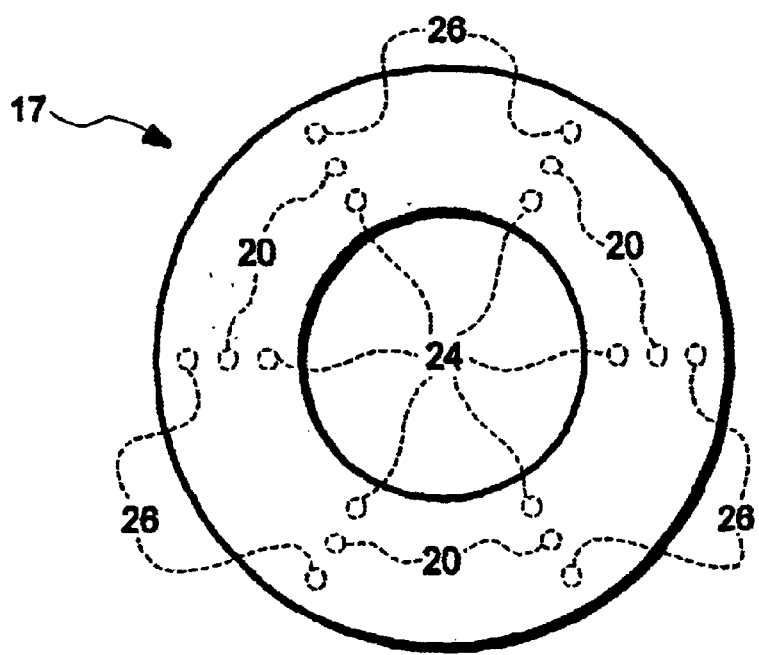
FIG. 4 is a front elevation view of the disc illustrated in FIG. 3.

Arrays of holes 20, 24 and 26 can be placed and spaced about the circular extent of disc sections 14 and 15, as is best shown in the front elevation view of FIG. 4 of the drawings, as well as radially spaced, so that the user has ample opportunity to view disc sections 14 and 15 for wear.

While a presently preferred embodiment for carrying out the instant invention has been set forth in detail above, those persons skilled in the brake disc art to which this invention pertains will recognize various alternative ways of practicing the invention without departing from the spirit and scope of the patent claims appended hereto.

We claim:

1. A brake disc wear indicator, said brake disc wear indicator comprising:

(a) a brake disc rotor casting, said casting having a first outer section and a axially opposed second outer section, each of said first and said second outer sections having an outer braking surface and substantially parallel inner surfaces, said outer braking surface of each of said first and said second sections for engaging a pair of opposed brake friction pads, said opposed braking surfaces being subject to substantially concave wear, and (b) a predetermined plurality of holes provided in each of substantially parallel inner surfaces of said first and said second outer sections of said brake disc rotor casting at different predetermined radial locations from a center hub of said rotor casting behind said outer braking surface of said each of said first and said second outer sections and at different predetermined depths and distances from said braking surfaces such that said holes are originally invisible by virtue of a presence of brake rotor material, but can become individually visible as said brake rotor material is successively worn away in a concave manner by braking to provide an indication of the amount and location of wear and even or uneven wear and wear patterns on the braking surfaces of the rotor.

2. A brake disc wear indicator, according to claim 1, wherein said holes provided in said brake disc rotor have different diameters, each of said different diameters providing an indication of the amount of rotor disc wear.

3. A brake disc rotor having a wear indicator and axially opposed braking surfaces subject to concave wear, said brake disc rotor wear indicator comprising:

(a) a predetermined plurality of holes provided in each of substantially parallel inner surfaces of said first and said second outer sections of said brake disc rotor casting at different predetermined radial locations from a center hub of said rotor casting behind said outer braking surface of said each of said first and said second outer sections and at different predetermined depths and distances from said braking surfaces such that said holes are originally invisible by virtue of a presence of brake rotor material, but can become individually visible as said brake rotor material is successively worn away in a concave manner by braking to provide an indication of the amount and location of wear and even or uneven wear and wear patterns on the braking surfaces of the rotor; and (b) at least one of said plurality of holes being made visible when said unworn rotor material originally overlying said plurality of holes is worn away in a substantially concave manner by braking action to initially expose said at least one of said plurality of holes before other of said holes become visible with further removal of rotor disc material occurring with further wear.

4. A brake disc rotor, according to claim 3, wherein said plurality of holes provided in said brake disc rotor have rounded bottoms to reduce an occurrence of stress risers and thus any concentration of thermal stresses in said brake disc rotor at said locations of said plurality of holes.

5. A brake disc rotor, according to claim 3, wherein said brake disc rotor has a center hub and said plurality of holes are circularly spaced.

6. A brake disc rotor, according to claim 3, wherein said plurality of holes provided in said brake disc rotor have varying diameters.

* * * * *